United States Patent [19]

Tamura

[11] Patent Number: 5,434,611
[45] Date of Patent: Jul. 18, 1995

[54] HOME HEALTH CARE SYSTEM WHICH EMPLOYS A TWO-WAY COMMUNITY ANTENNA TELEVISION NETWORK TO PERMIT COMMUNICATION BETWEEN A DOCTOR AND PATIENTS AT DIFFERENT LOCATIONS

[75] Inventor: Masakatsu Tamura, Yokohama, Japan

[73] Assignee: Matsushita Electric Industrial Co., Ltd., Osaka, Japan

[21] Appl. No.: 990,505

[22] Filed: Dec. 15, 1992

[30] Foreign Application Priority Data

Dec. 16, 1991 [JP] Japan .................. 3-331658

[51] Int. Cl.⁶ .......................................... H04N 7/10
[52] U.S. Cl. ........................................ 348/8; 348/10; 348/12; 348/14
[58] Field of Search .............. 358/93, 85, 86, 142; 455/5.1, 6.1, 6.3, 3.1; 348/6, 8, 10, 12, 13, 14, 15, 16, 17; H04N 7/10, 7/14, 7/15, 7/16, 7/167

[56] References Cited

U.S. PATENT DOCUMENTS 3,668,307 6/1972 Face et al. .................. 358/85 X
4,051,522 9/1977 Healy et al. ................. 358/93 X

FOREIGN PATENT DOCUMENTS 63-206077 8/1988 Japan .
1-200887 8/1989 Japan .

OTHER PUBLICATIONS

Allen, Roger "Coming: the era of telemedicine" IEEE spectrum 12/1976 pp. 31-35.
Gernsback, Hugo "The Teledoctor" Television Feb. 1955 pp. 22–24.

Primary Examiner—James J. Groody
Assistant Examiner—David E. Harvey
Attorney, Agent, or Firm—Spencer, Frank & Schneider

[57] ABSTRACT

A home health care system utilizing a community antenna television CATV system controls two-way communication between a doctor's terminal in a medical office and each of a plurality of subscriber's terminals with the aid of a multiple channel access MCA system line controller. The line controller selects an unused communication channel to connect monitoring television receiving television cameras, sender-receiver terminals, and data terminals at the doctor's terminal and a subscriber's terminal, so that the doctor can directly interrogate patients at home, and the patients can be automatically monitored at home using images and voice by the doctor in the medical office, without hindrance to normal CATV broadcasting.

11 Claims, 4 Drawing Sheets

HOME HEALTH CARE SYSTEM WHICH EMPLOYS A TWO-WAY COMMUNITY ANTENNA TELEVISION NETWORK TO PERMIT COMMUNICATION BETWEEN A DOCTOR AND PATIENTS AT DIFFERENT LOCATIONS

BACKGROUND OF THE INVENTION

1. Field of the Invention

The present invention relates to a home health care system which utilizes a two-way community antenna television CATV network to enable a doctor to directly interrogate patients at home and to monitor the condition of the patients.

2. Description of the Related Art

FIG. 4 is a block diagram showing the configuration of a home health care system utilizing a prior art two-way CATV network. In FIG. 4, the reference numeral 1 designates central equipment having an exchange. Transmission lines 2 comprised of bidirectional coaxial cables are connected to the central equipment 1. A video telephone 3 which is installed in a medical office like a hospital, a doctor's office and so on is also connected to the transmission lines 2, along with a plurality of video telephones 4 which are installed in the houses of subscribers.

In the home health care system having such a configuration, when a doctor examines a patient at home, the doctor and the patient communicate with each other using the video telephone 3 installed in the medical office or the like and the video telephone 4 installed in the subscriber's house through voice and image, thereby to perform the medical examination and treatment.

A typical CATV system transmits image and information to demanders through coaxial cables or optical cables. FIG. 5 is a block diagram showing the configuration of a prior art CATV system. In FIG. 5, reference numeral 10 designates central equipment which acts as a supply source for supplying the image and voice information through transmission lines 20.

In the central equipment 10, reference numeral 11 designates a head end as an interface to the transmission lines 20; reference numeral 12 designates a VHF antenna for receiving broadcast radio waves; reference numeral 13 designates a UHF antenna for receiving broadcast radio waves; reference numeral 14 designates studio equipment for producing sustaining programs; the reference numeral 15 designates an image switching controller for switching an image to a new image; and reference numeral 16 designates a return image receiver for receiving a video signal and voice information sent from a subscriber. Moreover, reference numerals 40 and 50 designate subscriber's terminals which are connected to the transmission lines and receive through television receivers 42 and 52 video and voice information sent from the central equipment 10 through converters 41 and 51. Incidentally, reference numeral 53 designates a television camera for sending a return video signal to the central equipment 10.

The home health care system of the abovementioned prior art utilizes the CATV system.

In the home health care system in the prior art, however, only the band for video signals of feed and return directions is used to perform medical examination and treatment by interview. Therefore, there arises a problem in that communication cannot be performed for the various kinds of information required for other medical examinations and treatments.

SUMMARY OF THE INVENTION

The present invention was made in order to solve the above-mentioned prior art problem.

It is therefore an object of the present invention to provide a home health care system by which a doctor can directly interrogate patients at home without hindrance to the normal broadcasting of CATV and in which patients staying in the houses of subscribers can be automatically monitored using images and sounds by central equipment.

In order to attain the above-mentioned object, a first aspect of the present invention provides that a home health care system includes central equipment constituting a two-way CATV network, a doctor's terminal in a medical office and the like or a plurality of subscriber's terminals connected to the central equipment through transmission lines, and line controlling means for assigning an unused channel as a telecommunication channel between the doctor's terminal and each of the subscriber's terminals thereby to establish mutual communications between the medical office and each of the subscribers by a multiple channel access MCA system, and the doctor's terminal in the medical office and each of the subscriber's terminals include equipment for enabling image voice and data communication to be performed when the telecommunication channel is established.

A second aspect of the home health care system of the present invention provides that emergency communication means may be included in each of the subscriber's terminals and emergency display means for displaying emergency signals may be included in the terminal in the medical office.

In a third aspect of the home health care system of the present invention, on the basis of an instruction issued from the doctor's terminal in the medical office, the subscriber's terminals are switched in sequence at predetermined intervals of time, so that the condition of patients staying in the houses of the subscribers can be automatically monitored by way of images and voice communication using the terminal in the medical office.

According to the first aspect of the present invention, since the MCA system is incorporated in the CATV network, a doctor can examine patients at home by utilizing audio video, and data communication without hindrance to the normal CATV broadcasting.

According to the second aspect of the present invention, by operating the emergency communication means, a doctor in the medical office can be informed immediately of the condition and the like of patients.

According to the third aspect of the present invention, the subscriber's terminals are switched in sequence by a doctor in the medical office to pick up image and voice information indicating the conditions of the patients, whereby the doctor can monitor the condition of the patients from his medical office.

Incidentally, a CATV system incorporated with an MCA system to establish communication of images and voice information between subscribers is disclosed in detail in JP-A-1-200887 by Satoh et al.

Moreover, a CATV system, which the subscriber can access through a branch transmission line employing leaky coaxial cables, is disclosed in JP-A-63206077. The reference shows an MCA system employed in the CATV system.

DESCRIPTION OF THE PREFERRED EMBODIMENTS

Preferred embodiments of the present invention will hereinafter be described with reference to the accompanying drawings.

Figure 1:
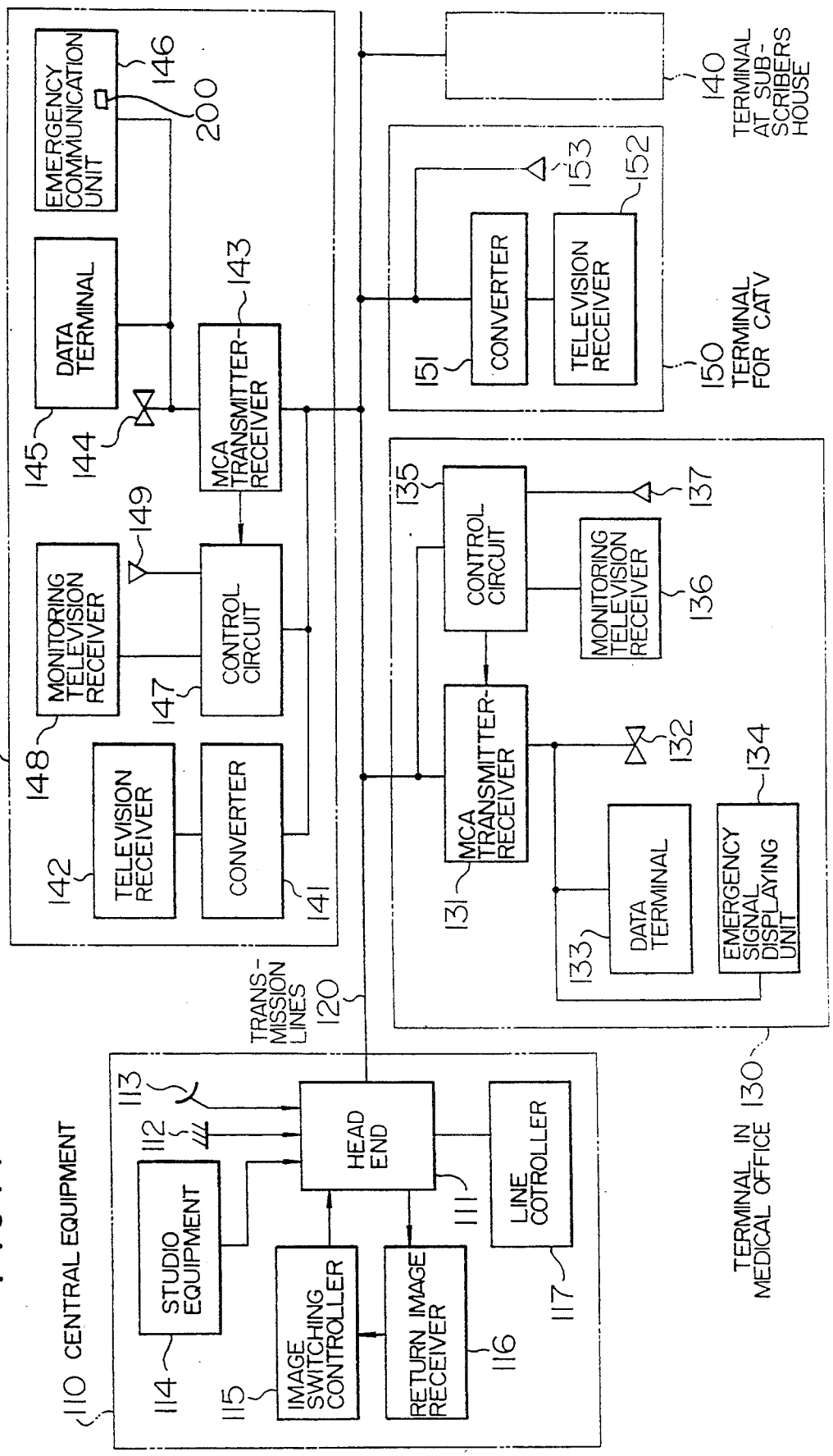
FIG. 1 is a block diagram showing the configuration of a home health care system according to an embodiment of the present invention.

FIG. 1 shows the configuration of a home health care system according to an embodiment of the present invention.

In FIG. 1, reference numeral 110 designates central equipment constituting a two-way CATV network; reference numeral 120 designates bidirectional transmission lines which are connected to the central equipment 110 and are comprised of coaxial cables or optical cables; reference numeral 130 designates a doctor's terminal which is connected to the bidirectional transmission lines 120 and is installed in a medical office like a hospital, a doctor's office and so on; reference numeral 140 designates a plurality of subscriber's terminals located in the houses of the subscribers which are connected to the bidirectional transmission lines 120; and reference numeral 150 designates a usual terminal for CATV which is connected to the bidirectional transmission lines 120.

The central equipment 110 includes a head end 111 for the two-way CATV system, an antenna 112 for VHF and UHF which is connected to the head end 111, an antenna 113 for satellite broadcasting which is connected to the head end 111, studio equipment 114 for producing sustaining programs which is connected to the head end 111, an image switching controller 115 which is connected to the head end 111, a receiver 116 for receiving return video signals which is connected to the head end 111 and the image switching controller 115, and a line controller 117 which is connected to the head end 111 and assigns the data channels to the respective terminals to perform the control by the multiple channel access MCA system. The doctor's terminal in the medical office 130 includes a transmitter-receiver 131 for the MCA system which is connected to the transmission lines 120, a sender-receiver terminal (or a telephone set) 132, a data terminal (a facsimile, a personal computer, a movable terminal or the like) 133 and a display unit 134 for displaying emergency signals which are individually connected to the transmitter-receiver 131, a television camera controlling circuit 135 for medical examinations which is connected to the transmission lines 120 and is controlled by the transmitter-receiver 131, and a television receiver 136 for monitoring and a camera 137 for generating return images which are connected to the television camera controlling circuit 135.

The subscriber's terminal 140 includes a converter 141 for a normal CATV system which is connected to the transmission lines 120, a television receiver 142 which is connected to the converter 141, a transmitter-receiver for the MCA system 143 which is connected to the transmission lines 120, a sender-receiver terminal 144, a data terminal 145 such as a facsimile, and an emergency communication unit 146 with an automatic dial which are individually connected to the transmitter-receiver 143, a television camera controlling circuit 147 for medical examinations which is connected to the transmission lines 120 and is controlled by the transmitter-receiver 143, and a television receiver 148 for monitoring and a camera 149 for return images which are connected to the television camera controlling circuit 147. On the other hand, the usual terminal 150 for the CATV system includes a converter 151 which is connected to the transmission lines 120, a television receiver 152 which is connected to the converter 151, and a camera 153 for return images which is connected to the transmission lines 120.

Now, the operation of the above-mentioned embodiment will be described in detail.

When the doctor's terminal in the medical office 130 intends to communicate with one of the subscriber's terminals 140, a doctor dials the telephone number of the specified subscriber's terminal 140 using the sender-receiver terminal 132, thereby to connect between the doctor's terminal and the associated subscriber's terminal. At this time, the line controller 117 assigns one of the unused channels as a communication channel between the transmitter-receivers for the MCA system 131 and 143. When the line between both the terminals 120 and 140 is secured, the control circuits 135 and 147 of both the terminals are operated, and as a result, the monitering television receivers 136 and 148 for medical examination and treatment and the cameras for return images 137 and 149 of both the terminals are connected to the line. Moreover, the sender-receiver terminals 132 and 144 of both the terminals are also connected to the line, so that a telephone call between the doctor and the patient by voice and image can be performed, i.e., the doctor can interrogate directly the patient at home. Moreover, if necessary, information is transmitted between both of the data terminals 133 and 145, so that various kinds of data can be transferred in real time and stored.

When a button 200, which could comprise a switch on the emergency communication unit 146 within the subscriber's terminal 140 is pushed in an emergency by the subscriber, the doctor's terminal in the medical office 130 is automatically dialed through the MCA line. Thus, the emergency signal displaying unit 134 of the doctor's terminal 130 is actuated, and as a result, patient information such as the address and the name, and other necessary information of the subscriber who has performed the emergency communication are diaplayed on the emergency signal displaying unit 134, or printed out. Thus, it is possible to effectively support of the rescue work for the patient at home.

Figure 2:
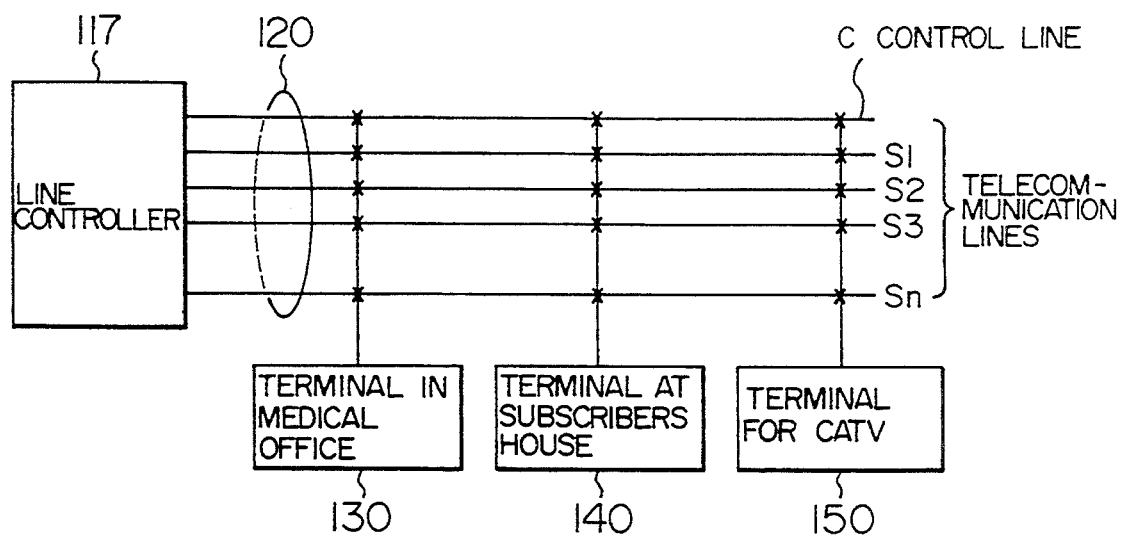
FIG. 2 is a diagram useful in explaining the principle of operation of an MCA line controller in the embodiment of the present invention.
Figure 4:
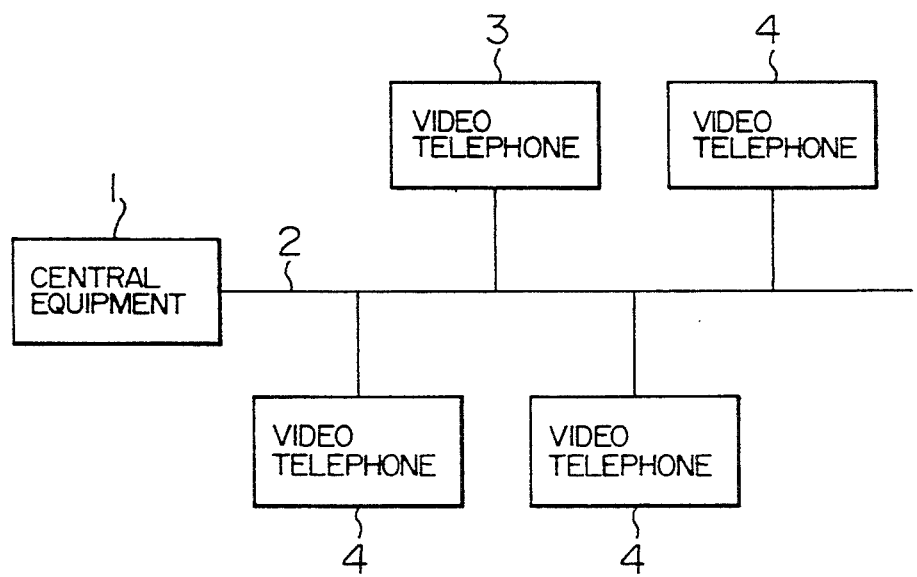
FIG. 4 is a block diagram showing the configuration of a prior art home health care system.

FIG. 2 shows the principle of the operation of the MCA line controller 117. In FIG. 2, the bidirectional transmission lines 120 to which the MCA line controller 117 are connected include a control line C having one channel and a plurality of telecommunication lines Sl to Sn having respective channels. The doctor's terminal 130 in the medical office, the subscriber's terminals 140 and the usual terminals 150 for the CATV system are connected to the control line C and the telecommunications lines S1 to Sn.

What will be described next is the procedure when, for example, the doctor's terminal 130 communicates with a subscriber's terminal 140.

(a) The doctor's terminal 130 sends a signal for the communication with the subscriber's terminal 140 through the control line C.

(b) The line controller 117 always monitors the control line C to pick up the above-mentioned signal on the control line C. Then, the line controller 117 selects an unused channel line out of the telecommunication lines S1 to Sn to assign this unused channel line as the telecommunication channel between the doctor's terminal 130 and the terminal 140, and sends the information to the terminals through the control line C.

(c) Then, both the terminals 130 and 140 automatically tune to the assigned telecommunication channel line to secure communication between the terminals.

(d) The assignment to the telecommunication lines S1 to Sn may be changed at every request. Thus, the telecommunication lines are used in common among the plurality of subscriber's terminals.

Figure 3A:
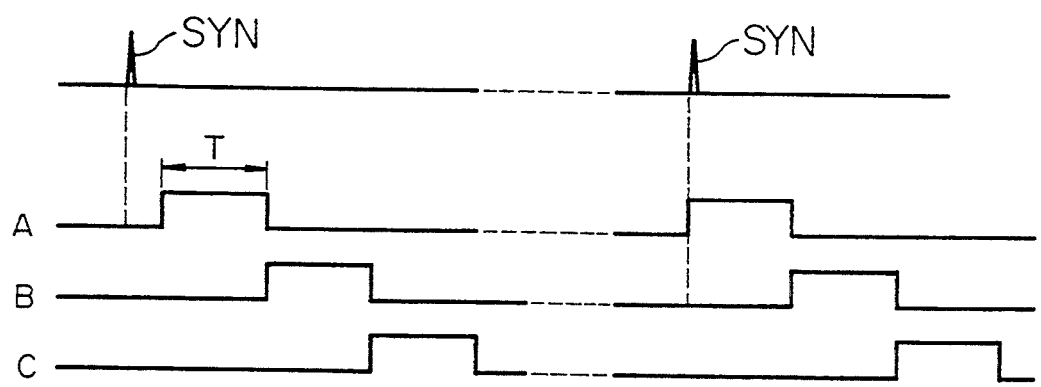
FIG. 3A is a time chart showing a method of switching terminals for automatic monitoring of patients using a synchronizing signal.
Figure 3B:
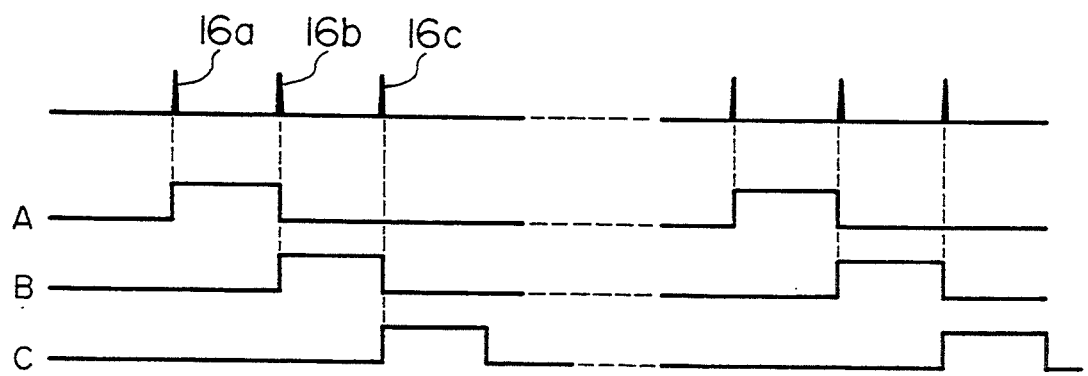
FIG. 3B is a time chart showing a terminal switching method for automatic monitoring of patients using individual dialing signal.
Figure 5:
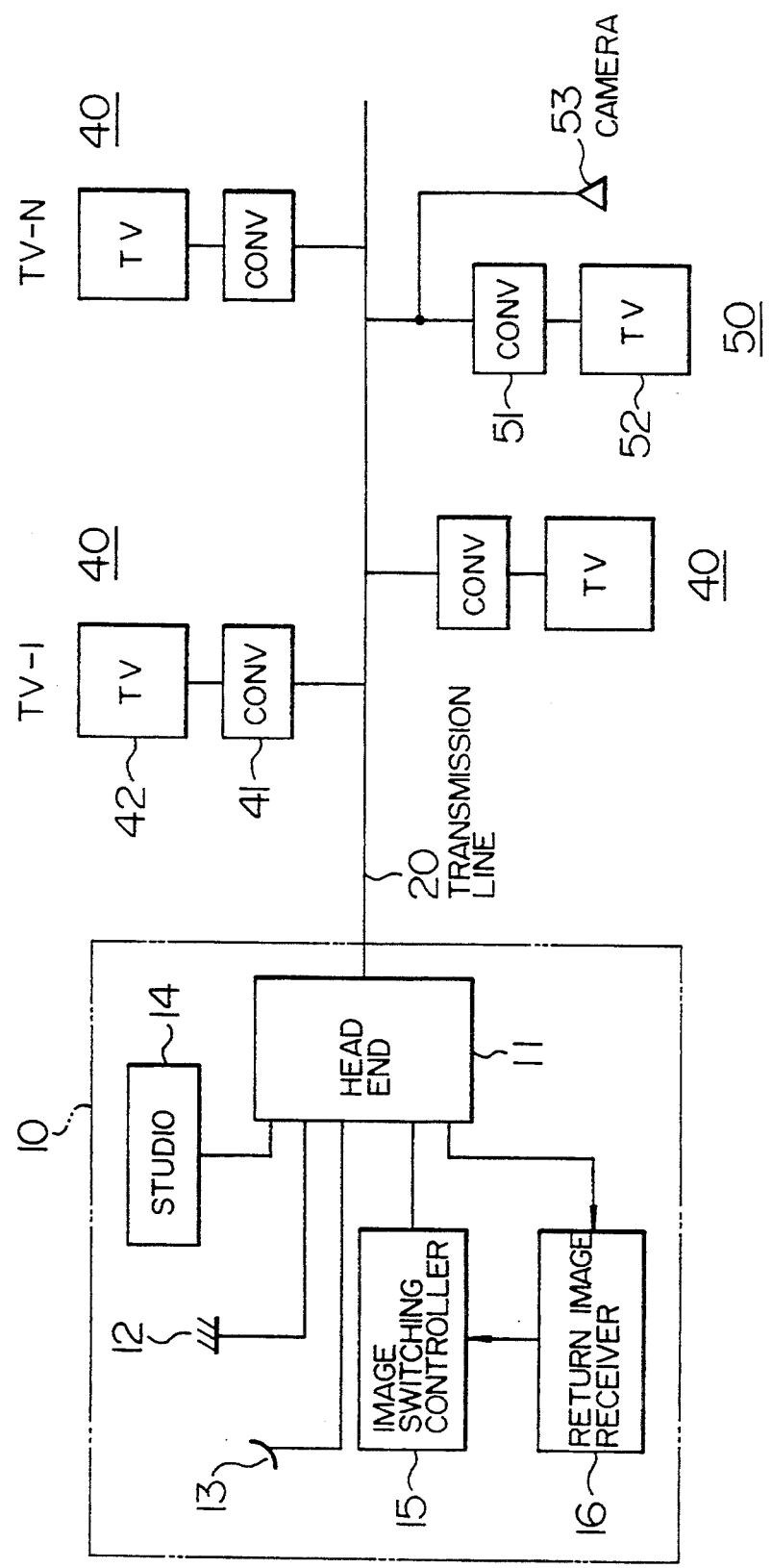
FIG. 5 is a block diagram showing the configuration of a prior art CATV system.

FIG. 3A and FIG. 3B are time charts useful in explaining a terminal switching method in the specific case where the patients at home, such as a plurality of elderly persons who are bedridden are automatically monitored by the medical office. FIG. 3A is a time chart showing a terminal switching method which utilizes a synchronizing signal, and FIG. 3B is a time chart showing a terminal switching method which utilizes an individual dial signal.

In the terminal switching method using a synchronizing signal, the synchronizing signal SYN is sent from the doctor's terminal 130 in the medical office to each of the subscriber's terminals A, B and C using a channel S of the MCA system. In the subscriber's terminals A, B and C, the cameras and the sender-receiver terminals are automatically connected to the respective lines, which have been automatically assigned, at predetermined intervals of time T. Then, the voice information and the images which have been sent from the cameras and the sender-receiver terminals are received in the time sharing manner by the monitoring television receiver and the transmitter-receiver of the doctor's terminal 130 in the medical office. As a result, a plurality of patients can be automatically monitored.

In the terminal switching method using individual dial signal, individual dial signals 16a, 16b and 16c are sent in sequence at predetermined intervals of time from the doctor's terminal 130 to the subscriber's terminals A, B and C through the channel S, respectively. As a result, after respective lines are established for a predetermined period of time T, and the cameras and the sender-receiver terminals which are installed in the subscriber's terminals are actuated, the images and the voice information which have been sent from the subscriber's terminals are received in a time sharing manner by the monitoring television receiver and the transmitter-receiver of the doctor's terminal 130 in the medical office. Thus, a plurality of patients can be automatically monitored.

Incidentally, it should be noted that the present invention is not limited to the configuration shown in the above-mentioned embodiment, and variations may be made by one skilled in the art as fall within the scope of the appended claims without departing from the spirit of the invention.

As will be apparent from the above-mentioned embodiment, according to the present invention, an MCA system which is different its frequency band is incorporated in a two-way CATV system, and the normal CATV channels a two-way video channel for home health care, and a MCA system channel for receiving and sending voice and various other kinds of data are used, so that a doctor can examine and treat patients at home through communication which includes images, voices and various kinds of other data, without hindrance to the normal CATV broadcasting, and the doctor can immediately check patients receiving medical treatment in cooperation with nurses and helpers.

Moreover, by operating the emergency communication means of the subscriber's terminal, a doctor in the medical office can be informed of the conditions of a patient's health.

Further, the home health care system of the present invention is designed in such a way that by utilizing the MCA system, a plurality of terminals of patients at home can be switched in sequence to be controlled by a doctor in a medical office. Therefore, the condition of the patients at home can be automatically monitored utilizing images and the voice communication by the doctor.

What is claimed is:

1. A home health care system in a two-way community antenna television network, said system comprising;

a central equipment controlling said two-way community antenna television network;

bidirectional transmission lines connected to said central equipment and including a control channel and a plurality of telecommunication channels;

a doctor's terminal in a medical office connected to said bidirectional transmission lines; and at least one subscriber's terminal connected to said bidirectional transmission lines, wherein said central equipment includes line control means, monitoring said control channel, for controlling said telecommunication channels in the manner of a multiple channel access MCA system, wherein said line control means selects an unused telecommunication channel and assigns said unused telecommunication channel for communication between said doctor's terminal and said at least one subscriber's terminal, wherein said doctor's terminal includes means for generating video and audio signals, an MCA transmitter-receiver for providing and receiving signals to and from said assigned telecommunication channel, and means for receiving and displaying emergency signals provided by said at least one subscriber's terminal, and wherein said at least one subscriber's terminal incudes means for generating video and audio signals and means for generating data signals, an MCA transmitter-receiver for providing and receiving signals to and from said assigned telecommunication channel, and an emergency communication unit including a button for automatically dialing to the doctor's terminal for displaying patient information, thereby to provide two-way video and audio communication between said doctor and said subscribers and data communication from said subscribers to said doctor.

2. A home health care system according to claim 1, wherein said at least one subscriber's terminal comprises a plurality of subscriber's terminals, and wherein said doctor's terminal includes means for generating command signals to sequentially enable said subscriber's terminals for predetermined intervals of time, thereby to automatically monitor patients at home through said doctor's terminal.

3. A home health care system according to claim 1, wherein said means for generating video and audio signals include a television camera, and wherein said means for providing and receiving signals includes a sender-receiver terminal and a monitoring television receiver.

4. A home health care system according to claim 1, wherein the means for receiving and displaying emergency signals displays the name and address of a subscriber whose button has been actuated.

5. A home health care system, comprising:
   a two-way television network which includes
   at least one transmission line providing a control channel and a plurality of communication channels,
   a plurality of subscriber's terminals connected to the at least one transmission line, and
   central equipment for controlling the television network, the central equipment being connected to the at least one transmission line, the central equipment including line control means for monitoring the control channel and assigning an unused channel for communication between two of the plurality of subscriber's terminals when one of the two subscriber's terminals emits a dialing signal on the control channel designating the other of the two subscriber's terminals,
   wherein the plurality of subscriber's terminals include
   a health care provider's terminal which comprises
   a voice sender-receiver terminal,
   a television monitor,
   an emergency signal output unit, and
   first interface means for connecting the voice sender-receiver terminal, the television monitor, and the emergency signal output unit to the at least one transmission line, the first interface means including a multiple channel access transmitter-receiver,
   wherein the plurality of subscriber's terminals additionally include a plurality of patient's terminals, each of which comprises
   a voice-sender-receiver terminal,
   a television camera,
   emergency communication unit means, having an emergency button, for automatically emitting a dialing signal which designates the health care provider's terminal if the emergency button is manually actuated, and
   second interface means for connecting the voice sender-receiver terminal, the television camera, and the emergency communication unit means of the patient's terminal to the at least one transmission line, the second interface means including a multiple channel access transmitter-receiver, and
   wherein the emergency signal output unit in the health care provider's terminal comprises means for outputting patient information concerning a patient whose emergency button has been actuated.

6. The home health care system of claim 5, wherein the voice sender-receiver terminal in the health care provider's terminal is a telephone set having means for permitting the health care provider to selectively generate dialing signals which designate a predetermined patient's terminal.

7. The home health care system of claim 6, wherein the voice sender-receivers in the patient's terminals are telephone sets.

8. The home health care system of claim 5, wherein the health care provider's terminal further comprises means for emitting a sequence of dialing signals which designate a sequence of patient's terminals so that the health care provider can monitor the patients in sequence.

9. The home health care system of claim 5, wherein the health care provider's terminal further comprises a television camera which is connected to the interface means of the health care provider's terminal so that the health care provider can send image data to the patient's terminals, and wherein each of the patient's terminals further comprises a television monitor which is connected to the interface means of the patient's terminal so that image data from the health care provider's terminal can be displayed, a television receiver, and a converter connecting the television receiver to the at least one transmission line.

10. The home health care system of claim 5, wherein the patient information that is output by the emergency signal output unit in the health care provider's terminal when a patient's emergency button has been actuated includes the patient's name and address.

11. The home health care system of claim 5, wherein the closed-circuit television network is a community antenna television network.

* * * * *